United States Patent Office 2,751,533
Patented June 19, 1956

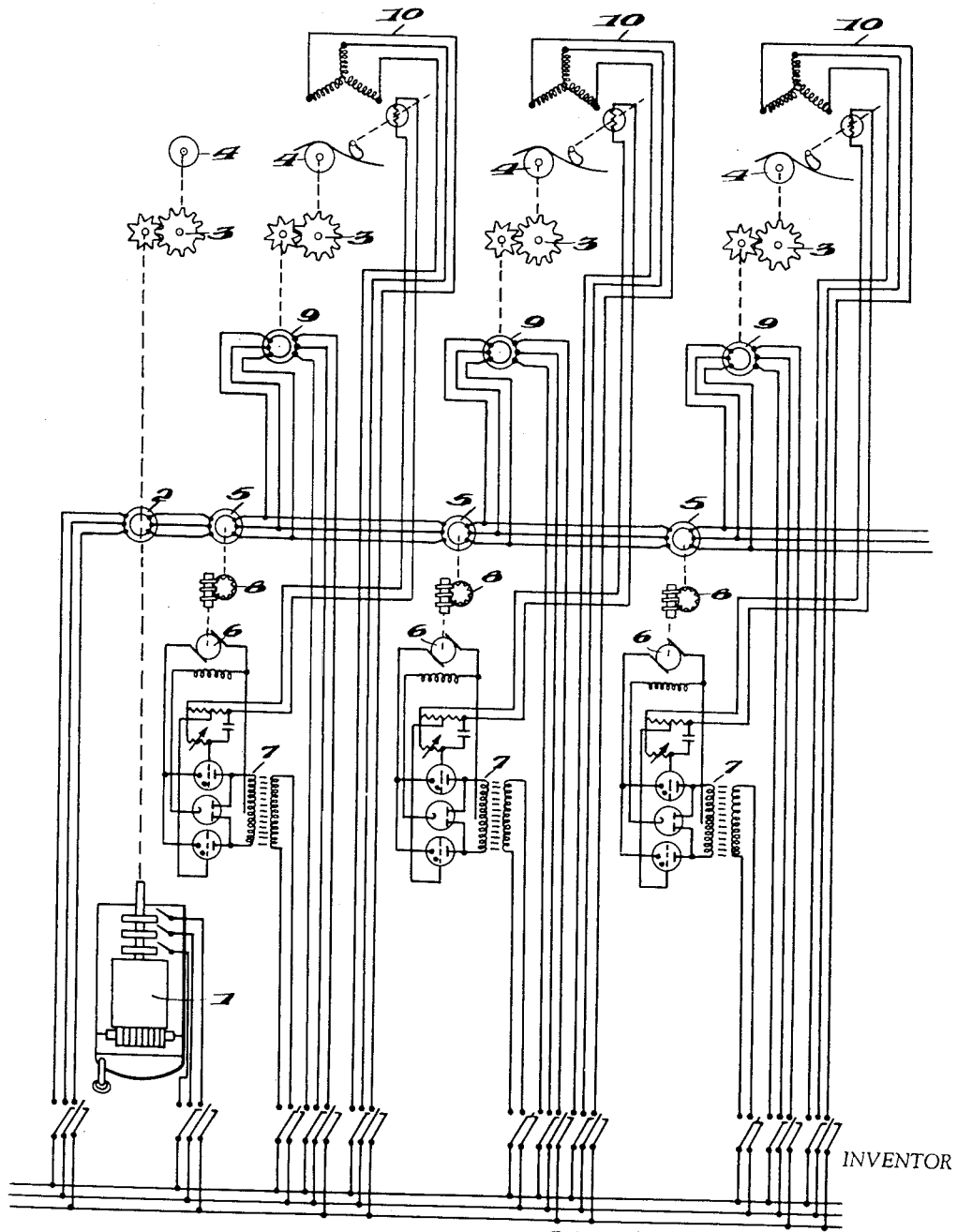

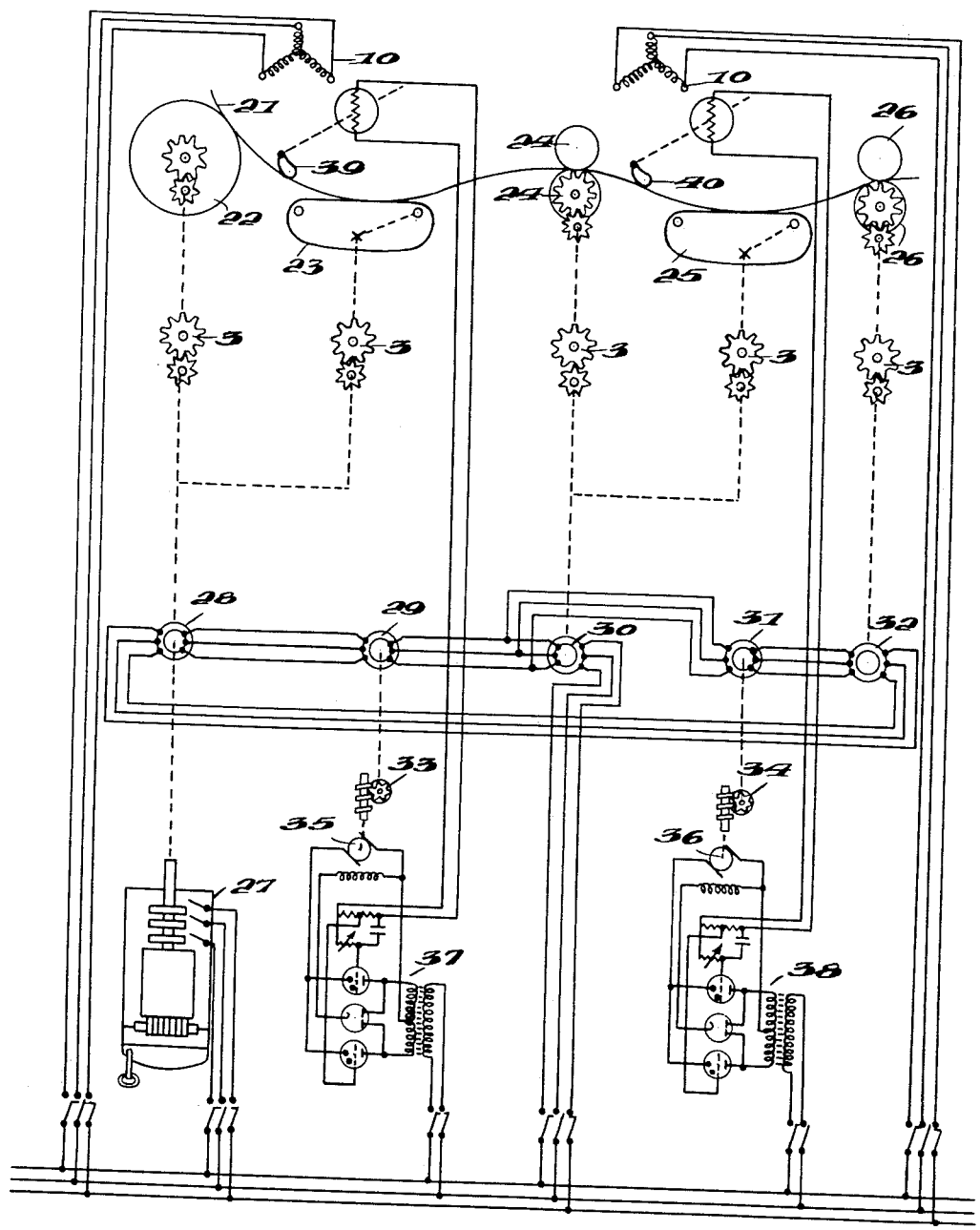

2,751,533
ADJUSTABLE ELECTRICAL TRANSMISSION SYSTEM

André Benoît de la Bretonière, Arnhem, Netherlands, assignor to American Enka Corporation, Enka, N. C., a corporation of Delaware Application July 21, 1952, Serial No. 300,035

Claims priority, appplication Netherlands August 7, 1951

10 Claims. (Cl. 318—7)

The invention relates to a device for regulating speeds of rotating bodies and to members driven by means of rotating bodies, in particular to devices connected to three-phase mains for driving and regulating the speed of members required to operate at functionally dependent speeds. The term "functionally dependent" is employed in a sense analogous to the mathematical use of "function," i. e., the speed of one member bears a definite relationship to the speed of another.

It is an object of this invention to provide means for automatically maintaining constant the speed ratios of a plurality of mechanisms that must operate at functionally related speeds.

It is a further object to provide means as aforesaid that may be controlled by any measurable characteristic of the respective output of each such machine.

Another object is to improve the means for controlling industrial operations that involve a plurality of coordinated steps for the coordinated functioning of a plurality of utilities.

In technics it is frequently necessary or desirable that a plurality of mechanisms be operated in tandem, so coupled together that their respective speeds maintain a specific proportional relationship to each other. Such mechanisms may be pressing or forming devices, transporting or conveying mechanisms, etc., and combinations of those various types of machines. Accurate control and regulation of the speeds of the mechanisms in a train are essential to successful operation. A well-known application, in which such a device is used is the manufacture of paper.

If, for example, in paper-making the web of paper runs over various rollers, these can be driven individually or in groups, whereby the regulation of the speeds of these rollers can be effected in various ways.

For example, an adjusting system is known, whereby the various rollers are driven by means of direct-current motors and the regulation of these direct-current motors is effected by a control system of mechanical belt transmission and mechanical differentials.

It is known that the regulation can take place by individual electromotors, each of which is regulatable by itself. It is also known that this regulation can be performed with the aid of a mechanical shaft system whilst interposing variable couplings, such as, for example, the well-known P. I. V.-variator, which makes it possible to give the various shafts of the rotating transporting members differing, but interrelated speeds.

However, several circumstances occur, under which it is desirable that the successive rotating members indeed have differing speeds, but whereby it is necessary, in order to obtain a well-operating mechanism, that these transporting members each move with a speed, which is in a constant proportion to one another, and in particular that this constant proportion is maintained. The latter condition can not be adequately met by mechanical regulation.

A special difficulty may be encountered when the driving takes place by means of individual electromotors, if, for example, the first rotating member of a series is driven by a motor, which is normally loaded, but the motors driving the following members operate at considerably less than their rated capacities. In the case of a variation in the mains voltage, which, as is known, occurs rather often, the phenomenon may then be encountered that the first motor, which is at full load, reacts more strongly to this variation in the mains voltage than the following motors. On the other hand, when the mains voltage is constant, load variations, which are always to be expected, can more or less exert a disproportionate influence on the numbers of revolutions of the various driving motors. Therefore if at a certain moment a correct ratio of the speeds of the various members with respect to one another has been attained, this speed ratio is disturbed by a variation occurring in the mains voltage, and/or by load variations or variations in consequence of changed motor temperature and such like causes.

Another difficulty, particularly occurring with transporting members, is that the properties of the material to be transported, for example, a liquid or a thread-, ribbon-, film- or foil-like body, are not constant. Such difficulties occur, for example, during the formation of paper-like tapes and during the formation and the treatment of artificial threads. It may then occur that, in consequence of external circumstances, such as temperature, humidity of the air, etc., but also in consequence of internal circumstances of the material, it is necessary to change the speed ratio between the first and the second transporting member temporarily or permanently at the moment when the material passes the first transporting member, whilst it may at the same time be desirable that the ratio of the speed between the second and the subsequent transporting members remains unchanged.

Heretofore it has usually been necessary to make such required adjustments by hand. A continuous observation and readjustment of the speeds by the operatives is then necessary. Where this causes too many difficulties, in many cases one has had to be satisfied with a less good operation resulting from the deviating properties, without it being possible to adapt the process conditions by timely correction of the speeds in such a way that these give the most favorable result at any moment.

According to the invention, a solution has now been found, which can be indicated as a regulatable and controlling electric shaft and differential combination. According to its structure this device is capable of keeping constant within very narrow limits the ratio of the speeds of the rotating bodies as well as the speeds of the members driven by means of these rotating bodies, independent of the variations in the mains voltage or in the load and such like causes. Moreover, this device is capable of effecting automatically a difference in the ratio of the speed of rotation of one set of the rotating bodies with respect to that of a subsequent set, whilst at the same time the ratio of the speeds of the remaining sets of rotating bodies does not change and remains constant within very narrow limits.

The word "utility" is used herein to designate anything that is operated to serve a useful purpose, and may be a single device, such as a pump, or a coordinated group of devices, depending upon the result to be achieved.

A system according to this invention is characterized by at least one main frequency converter, which is composed of a regulatable motor, which is mechanically coupled with an asynchronous generator, the stator of which is connected to the three-phase mains and the rotor of which is connected electrically to one unit or to a number of units, which units act partly as transformers and partly as electric differentials and the terminals of which, on which the transformed and differentiated electric energy is available, are connected to driving motors of the utilities. These units, acting partly as transformers and partly as electric differentials, each consist of an asynchronous polyphase induction motor with slip-ring armature, the rotor of which is driven mechanically by a direct-current motor, which direct-current motor is fed and controlled by a tube rectifier, the grid voltage of which is effected by a control unit. According to the invention the rotor can be driven mechanically via a unilaterally operating transmission mechanism.

Thus, by means of this device, which is connected to three-phase mains, electric voltages with various continuously adjustable frequencies are excited, to which three-phase-current driving motors for the rotating bodies and the members driven by these can be connected. The ratios of these continuously adjustable frequencies can be kept constant so far as desired, independent of variations in the mains voltage and/or the load and/or other causes. The ratios of these frequencies are further arbitrarily adjustable, whilst it is also possible, as circumstances require, to change these ratios continuously during operation by using a control member, which is influenced in a way known per se by one or more mechanical, physical or chemical properties of the material, which with the aid of the rotating bodies and the members driven by these, is subjected to one or more treatments or is transported by these rotating bodies or members.

In case only the ratio of the frequencies and, thus, the ratio of the speeds of all rotating bodies is to be kept constant within very narrow limits, but these are to be made independent of variations in the mains voltage and/or the load, a tachodynamo is used as a member for controlling the grid voltage. If the ratio of the speeds is to be changed in connection with the properties of the material, a member, which is influenced by the properties of the material or body to be treated or transported, is used for controlling the grid voltage.

A system according to the invention can be used, for example, when spinning synthetic fibres, whereby the first driven member is one spinning pump or a group of spinning pumps, which press a molten polymeric substance through one or more nozzles. The second member can be, for example, a roller, over which the thread formed passes and the third member can be a winding mechanism or a roller, around which the thread runs slipfree, whilst the fourth member can be a winding mechanism, whereby a stretching of this thread can take place between the third and the fourth member. In many cases it will be sufficient if the ratio of the speeds is kept constant. However, in some cases it is of the greatest importance that, if, for example, variations of temperature, viscosity and the like occur in the molten polymer just before this is pressed through the nozzle, a small change can be made automatically in the ratio of the speeds of the following members, which can be done according to the invention.

Another field, in which a device according to this invention can be used advantageously is in the manufacture of drawn metal wire.

Also when transporting a liquid, a device according to the invention can often be used advantageously, for example, when the first moving member is a pump, which pumps a liquid through a tube and this liquid discharges into a tank, in which tank a constant addition of another liquid takes place, the amount of which must be in constant proportion to the liquid flowing in first, known as "proportioning." The member moving this added liquid, is then the second member, and the next member can be used for the constant discharge of the mixed liquids from the tank.

Another field for the application of this device can be the manufacture of viscose rayon on a continuous spinning machine, whereby this rayon passes many rotating transporting members between the moment when the viscose leaves the nozzle with a certain speed and finally the ready product is wound, whereby it is necessary that the transporting members always move in constant proportion of speeds with respect to one another, which proportion must preferably be continuously adjustable. It is, for example, often desirable to regulate the winding of the dry thread as a function of the moisture content.

Another example of the application of the device is a normal paper machine known in the paper industry.

Another example, which follows below in order to elucidate the invention with reference to a schematic drawing, is, for example, the formation of a thick fleece consisting of alkali cellulose as this is used in the continuous soaking of cellulose for large scale manufacture of staple fibres.

In this last example, a slurry of cellulose fibres in lye is prepared. In a tank, to which this slurry is supplied, a suction cell rotary filter of well-known type moves. In consequence of the negative pressure prevailing in the cells of this filter, a thick fleece of alkali cellulose fibres is formed on the wire gauze, which fleece may have a thickness of the order of magnitude of about 1 cm. During the rotation of this filter, this fleece is partly pressed out and sucked off, after which at a certain place, by breaking the vacuum, this fleece leaves the suction cell rotary filter and moves, whilst supported by a conveyor belt, to a system of rollers, where it is pressed out, after which, again supported by a conveyor belt, this fleece moves to the next system of rollers, after which the fleece is cut into pieces.

The invention will be elucidated below with reference to the drawing, in which, as examples, two embodiments of the device according to the invention are shown.

Fig. 1 gives a schematic representation of a system according to the invention in the most general sense as it can be applied to all possible fields and purposes.

Fig. 2 gives a schematic representation of a system according to the invention as this is, by way of example, suitable for one certain application, viz. the continuous preparation of alkali cellulose by means of a suction cell rotary filter.

In both figures the electric connections are indicated by full lines and the mechanical connections by dashed lines.

In Fig. 1, the main frequency converter is indicated by the parts 1 and 2. The numeral 1 indicates a regulatable main motor, which may be a three-phase commutator motor, whilst 2 is the asynchronous generator, the stator of which is connected to the three-phase mains 40. With a device according to the invention, a large part of all effective energy, the quantity of which depends on the power requirements of the utilities to be driven by the system, is supplied by this regulatable motor 1. In the case of very large installations with a large power consumption, it is obvious that other regulatable motors and asynchronous generators may be added.

A part of the energy of the regulatable motor 1 can be used for driving directly, by means of a mechanical coupling, for example, a gear transmission 3, a first rotating body 4; it is clear that a rotating body 4 can also be directly driven mechanically without interposing transmission 3. The asynchronous generator 2 supplies the energy for the unit or units 5, which serve as transformers for energy transport and which also act as electric differentials.

These units, the number of which varies in dependence on the circumstances, each consist of:

1. An asynchronous polyphase induction motor 5 with slip-ring armature.

2. A direct current motor 6 with its armature and/or field fed by an electronic rectifier, which is schematically indicated at 7.

3. A preferably unilaterally operating transmission mechanism 8, through which the rotor of the asynchronous motor 5 is driven by the direct current motor 6. A self-braking worm wheel with worm gives very good results here. This prevents motor 5 from taking charge as a motor and running away from the control by 6.

The motors 5 are operated in series with the rotor of each, except the last one in the series, connected to the stator of the next succeeding one in the series. These motors 5 may be termed electrical differentials, since the frequency of the current taken off the rotor of each depends upon the frequency of the current supplied to the stator thereof and upon the rate at which the rotor is driven by the respective direct current motor 6, and the output is consequently analogous to the output of a mechanical differential having two inputs that may be different and may vary during operation.

The output of each differential 5 is also electrically connected to the rotor of a respective utility-driving motor 9, whereof the stator is supplied from the three-phase mains. These motors 9 are preferably asynchronous polyphase induction motors with slip ring rotors. It is apparent that for light service polyphase induction motors fed solely from the output of differential 5 may be used.

The motor control unit 7 may be of the well-known thyratron type, with phase shifter to change the relative phase of the voltage on the grid and the anode and so control the output. Means to regulate the setting of the phase shifter in accordance with an essential operational result of the utility 4 is indicated schematically at 10. It is evident that in the general case depicted in Fig. 1 the regulating means can be shown diagrammatically only, since the controlling result may be humidity, color, dimensional thickness, tension, sag, velocity or pressure of a liquid, linear speed of a sheet or filament, or any other physical, chemical or other measurable attribute of an item produced or worked upon by the utility 4'.

The number of revolutions of a driving motor 9 are determined by the formula:

$$n_p = n_o + \sum_1^p n_d$$

where $n_o$ = number of revolutions of the main motor 2
$n_{d_{1,2}} \ldots$ = number of revolutions of the first, second ... differential 5
$n_p$ = number of revolutions of motor 9

It appears from this relationship that the differences in the number of revolutions between two successive driving motors 9 are only determined by the number of revolutions of the interposed differential.

In Fig. 2, a device for a continuous preparation of alkali cellulose with the aid of a suction cell rotary filter is given schematically in detail. A fleece 21 leaves such a filter 22, moves over a conveyor-belt 23 to a system of rollers 24, then over a conveyor-belt 25 to a system of rollers 26. In this case the members 22 and 23, as well as 24 and 25, each time form a group of transporting members, each of which are driven by one rotating body.

The suction cell rotary filter is driven here by a regulatable electromotor 27, for example a direct current motor or a three-phase commutator motor. This motor is mechanically connected to the first asynchronous polyphase induction motor with slip ring armature 28, the rotor of which is driven by this motor. It is clear that, since this is a mechanical gear wheel coupling, the number of revolutions of this motor are, indeed, in a certain ratio to the number of revolutions of the shaft of the suction cell rotary filter driven by this motor, but it need not be the same speed.

The stator of this motor 28 is connected in the normal way to the three-phase mains. The three phases of the rotor of this motor 28 are electrically connected via the frequency converter 29 to the rotor of the motor 30, the stator of which is connected to the mains.

In the same way, the rotor of the motor 29 is via the frequency converter 31 connected to the rotor of the motor 32, the stator of which is also connected to the mains.

The electrical differentials or frequency converters 29 and 31 are asynchronous motors with slip ring armature; the stator of 29 is connected electrically to the rotor of 28 and the stator of 31 to the rotor of 29. The rotor of 29 is also connected electrically to the rotor of 30 and the rotor of 31 to the rotor of 32. The rotors of 29 and 31 are driven mechanically via the worm wheels 33 and 34. Each of these worm wheels is driven mechanically by the armature of a direct current motor 35 or 36. These direct current motors are fed from the mains with the aid of a tube rectifier system, respectively shown schematically at 37 and 38, the grid voltage of which can be regulated in a way well known in the art.

If only the ratio and the differences in speeds between all the driven members of motion, here the members 22 with 23, 24 with 25, and 26, are to be kept constant, a tachodynamo is used as a regulating member for the grid voltage. It is not given in the figure.

Herewith the whole transporting mechanism has become independent of changes in voltage in the mains and of unintended load variations, in that the ratio or differences in speeds remains or remain constant, even if the regulatable electromotor 27 would show an appreciable slip in consequence of these changes in voltage and load variations.

However, in this special case, which has been described here as an example, it often occurs that in consequence of small differences in concentration in the alkali cellulose slurry, from which the fleece on the suction cell rotary filter is formed, or in consequence of other not always completely known factors, the properties of the fleece change somewhat, and it becomes necessary to change the ratio of the speeds of 22 with 23, 24 with 25, and 26. It may occur that only the ratio of 22-23-24-25 has to be changed but the ratio of 24-25-26 must remain equal, whilst the reverse may occur as well or even the case that the ratio of 22-23-24-25 and the ratio of 24-25-26 must be changed. In order to achieve this, no tachodynamo is used for controlling the grid voltage in the system 37 or 38, but the grid voltage of this tube rectifier is controlled in a way known per se, by means of the change in position of the feeler 39 and 40. In this way with the slightest change in the sag or thickness of the fleece 21 after the filter 22 or after the system of rollers 24, the ratio of the speeds is corrected immediately till the same desired sag is reached again.

Although the dimensions of the various motors used in this system must of course be adapted completely to the material to be processed, and although it is clear to every expert that in synthetic fibre-spinning, quite another order of magnitude is applied than in the example described above, the normal knowledge of an expert in this field is sufficient to calculate the size of motor for any individual case.

It must only be pointed out that the frequency converters must be calculated in such a way that on stopping and when full current passes through them, they do not become unduly hot.

It will have been noted from the foregoing that practice of the present invention involves generating a polyphase electric current of what may be termed a master frequency that is functionally related to an essential operational result of a utility which establishes a base for the operation of other utilities concerned with the system, and the frequencies for operating the other utilities are derived from the master frequency and hence may be called subordinate frequencies.

It is recognized that the word "utility" used herein is broad in scope, but that breadth is necessary in view of the very inclusive field of application of this invention above pointed out. Such utilities are not necessarily rotating bodies or members, but may have linear movement such as, for example, the piston of a pump or of an extrusion device.

I claim:

1. A driving system for a plurality of utilities required to operate on a flexible work piece at functionally dependent speeds, comprising an electrical differential operatively associated with each utility to supply at least a part of the power to operate the utility, each differential having a rotor and a stator, an electrical input to the stator of polyphase alternating current of frequency controlled in accordance with the requirements of the system, a mechanical input to the rotor, feeder means connected to sample tension in said flexible work piece and develop a signal in response to changes therein, means responsive to said signal to control the angular velocity of the mechanical input to said rotors of said differentials, and at least one motor in mechanical driving connection with the respective utility, the rotor of the motor being connected to receive current from the rotor of the differential cooperating with that utility.

2. A system as set forth in claim 1, which includes a polyphase asynchronous generator whereof the stator is connected to three-phase supply mains and the rotor is mechanically driven, and means connecting the rotor of the generator to supply frequency-controlled polyphase current to the stator of the electrical differential as aforesaid.

3. A system as set forth in claim 1, wherein the electrical differential is an asynchronous polyphase induction motor with slip ring rotor.

4. A system as set forth in claim 1, wherein the mechanical input to the rotor of the electrical differential is applied through a unidirectionally operating transmission mechanism.

5. A system as set forth in claim 1, wherein all the electrical differentials for the plurality of utilities are connected in series, the rotor of each differential being connected to the stator of the differential next following in the series.

6. A system as set forth in claim 1, wherein the stator of the motor is supplied from three-phase mains.

7. A system for powering a plurality of utilities required to supply tractive effort to a flexible workpiece at functionally dependent speeds, comprising a regulatable speed prime mover, an asynchronous polyphase electric generator, means mechanically connecting the rotor of the generator to the prime mover to be driven thereby, means to supply polyphase current to the stator of the generator, a plurality of electrical differentials each having a rotor and a stator, means electrically connecting the rotor of the asynchronous generator to the stator of one of the differentials, means electrically connecting the rotor of each of the differentials except one to the stator of a respective other differential, a respective driving motor for each utility, means electrically connecting the rotor of each driving motor to the rotor of a respective differential, electrical connections to supply to the stator of each driving motor polyphase current the same as that supplied to the stator of the asynchronous generator, respective unidirectionally operating mechanical driving means to drive the rotor of each differential, feeler means operatively mounted to deflect in unison with changes in tension in said flexible work piece and to control the rate of mechanical drive of the rotor of the electrical differential supplying current to the driving motor of the respective utilities.

8. A system as set forth in claim 7, wherein each electrical differential is an asynchronous polyphase induction motor with slip ring rotor.

9. A driving system for a plurality of utilities required to operate at functionally dependent speeds, comprising means to generate an electric current of a master frequency, means connected to be supplied with current of the master frequency and to set up a rotating field, rotor means controlled by tension responsive means operatively connected between pairs of said utilities and movable in the rotating field to derive a current of a first subordinate frequency, utility-driving means connected to receive current of the first subordinate frequency, means electrically connected to receive current of the first subordinate frequency and set up a second rotating field, means controlled by a second utility and movable in the second rotating field to derive a current of a second subordinate frequency, and a second utility-driving means connected to receive current of the second subordinate frequency.

10. A driving system for a plurality of utilities required to operate on moving material at functionally dependent speeds, comprising a prime mover mechanically connected to drive a first utility, a first electrical differential having a rotor and a stator, the rotor being mechanically connected to be driven by the prime mover and the stator being connected to a polyphase supply, a second electrical differential having its stator connected to be supplied from the rotor of the first differential, means to drive mechanically the rotor of the second differential at a speed controlled by an essential operating result of the first utility, a first motor mechanically connected to drive a second utility, the rotor of the motor being fed from the rotor of the second differential and the stator of the motor being fed from a polyphase supply, a third electrical differential having its stator electrically connected to the rotor of the second differential and means to drive mechanically its rotor at a speed controlled by an essential operational result of the second utility, and a second motor mechanically connected to drive a third utility, the rotor of the second motor being supplied from the rotor of the third differential and its stator being supplied from polyphase lines, said means to derive said rotors of said second and third differentials operatively mounted to deflect in unison with tension changes in said moving material.

References Cited in the file of this patent

UNITED STATES PATENTS 2,169,016     Baker _____ Aug. 8, 1939